United States Patent [19]

Arsenault

[11] Patent Number: 4,611,404
[45] Date of Patent: Sep. 16, 1986

[54] CALIPER FOR THREAD MEASUREMENT

[76] Inventor: Ronald G. Arsenault, 10506 Ashby Rd., Jacksonville, Fla. 32218

[21] Appl. No.: 810,507

[22] Filed: Dec. 19, 1985

Related U.S. Application Data

[63] Continuation of Ser. No. 566,906, Dec. 29, 1983, abandoned.

[51] Int. Cl.⁴ .......................... G01B 3/38; G01B 3/40
[52] U.S. Cl. .................................. 33/199 R; 33/147 M; 33/167; 33/164 D
[58] Field of Search .......... 33/147 M, 143 M, 147 K, 33/199 R, 199 B, 164 C, 164 D, 167

[56] References Cited

U.S. PATENT DOCUMENTS

| | | | |
|---|---|---|---|
| 2,410,571 | 11/1946 | Easton et al. | 33/167 |
| 2,937,452 | 5/1960 | Man | 33/199 R |
| 2,941,304 | 6/1960 | Man | 33/199 R |
| 3,111,766 | 11/1963 | Bryant | 33/167 |

FOREIGN PATENT DOCUMENTS 513263 10/1939 United Kingdom .............. 33/199 B

Primary Examiner—Willis Little
Attorney, Agent, or Firm—Arthur G. Yeager

[57] ABSTRACT

A caliper for measuring the diameter of a member having internal or external screw threads including a combination structure attached at each end thereof which includes a holder to which is removeably attached a thread profile planar member.

22 Claims, 8 Drawing Figures

CALIPER FOR THREAD MEASUREMENT

This is a continuation of co-pending application Ser. No. 566,906 filed Dec. 29, 1983 now abandoned.

BACKGROUND OF THE INVENTION

Calipers are well known instruments for measuring dimensions of various articles. Vernier calipers employ linear movement adjustable by a fine screw thread with scales to measure up to a ten-thousandth of an inch. Micrometer calipers employ rotational movement by a fine thread to accomplish the same purpose. Calipers are generally constructed in two types, one to measure outside dimensions and the other to measure inside dimensions, e.g., outside or inside diameter of a cylindrical member. In special instances the micrometer is made to measure the outside or inside diameters (root diameter or pitch diameter) of screw threads on a pipe or various large shafts or nuts for ship's propellers, etc. In such instances it is, of course, necessary to have a wide variety of tips on the micrometer caliper so as to fit each of the many types and sizes of screw threads that are used today. The expense of maintaining a plurality of specially machined tips, as used in micrometers of U.S. Pat. No. 1,797,121 to Bohn, U.S. Pat. No. 2,287,097 to Graham, or U.S. Pat. No. 2,249,611 to Johnson, is considerable. Accordingly, it is an object of this invention to provide a much simpler and less expensive micrometer caliper, particularly for internal measurements of large diameter screw threads. Other objects will appear from the more detailed description of this invention which follows.

BRIEF DESCRIPTION OF THE INVENTION

This invention relates to a caliper having a body of at least two cooperating members relatively movable with respect to each other to cause the distance between the members to be longer or shorter along a linear lengthwise measurement axis; the improvement which comprises a combination structure attached to each of said members in axial alignment, each said structure including a means for attachment to said member at a desired extension from said member, a head at the end of said attachment means and a tip clampable to said head and having a selected contour appropriate to the contour of the object being measured by the caliper.

In a preferred embodiment the caliper is a micrometer caliper having a body which is a combination of two concentric cylinders and having an arm extending outwardly along the axis of the body from each end thereof, and the tip includes a rotatable holder into which is clamped a planar thin sheet having the desired thread profile cut along the outside edge.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
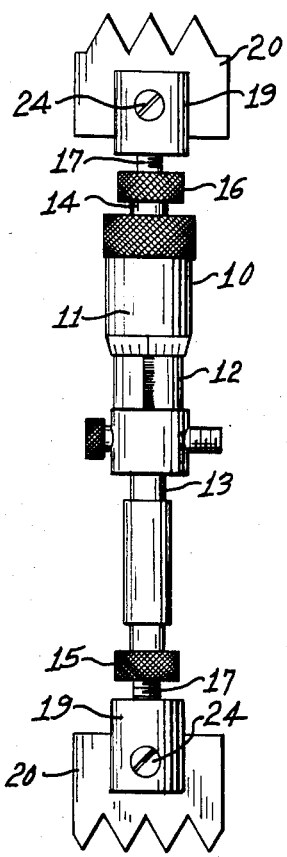
FIG. 1 is a plan view of the internal micrometer of this invention.

In FIG. 1 there may be seen the assembled micrometer caliper of this invention used to make measurements of internal threads. The micrometer caliper body 10 is a commercially available micrometer caliper, normally including two concentric cylindrical portions 11 and 12. Cylinder 11 is rotatable about the lengthwise axis of the cylinders and cylinder 12 is fixed. When cylinder is rotated, normally on very fine internal threads, the overall length of body 10 lengthens or shortens depending on the direction of rotation. Index markings on cylinders 11 and 12 provide a means for measuring exactly (usually to one ten-thousandth of an inch) the length of body 10. At one end of body 10 is an extension arm 13 and at the other end of body 10 is another extension arm 14 so that various tips may be attached thereto for contacting various contoured surfaces from which measurements are to be taken. All of the foregoing micrometer caliper structure is known in the prior art.

This invention provides an improved structure of the end portions attachable to arm 13 or 14. Threaded shank 17 is inserted into the internal threads of arms 13 and 14 and maintained in any desired depth by lock nut 15 being tightened against arm 13 or lock nut 16 being tightened against arm 14. At the outer end of shank 17 there is a holder 19 that is freely rotatable about shank 17. Holder 19 serves to clamp thread profile plate 20 in place by means of clamp screw 24. Arms 13 and 14 can be provided in different lengths to make this micrometer caliper useful for a wide range of measurements. When calibration of the micrometer caliper is required, threaded shanks 17 are adjusted until the overall length from the tip of one plate 24 to the tip of the other plate 24 is adjusted to an exact calibrated length at a zero setting of the scale.

Figure 2:
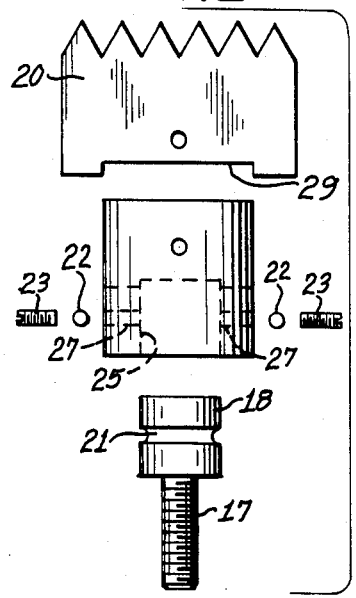
FIG. 2 is an exploded plan view of the structure of the components at each end of the micrometer.
Figure 3:
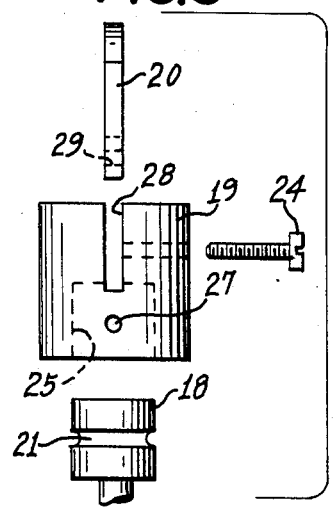
FIG. 3 is an exploded side view of the components of FIG. 2.
Figure 5:
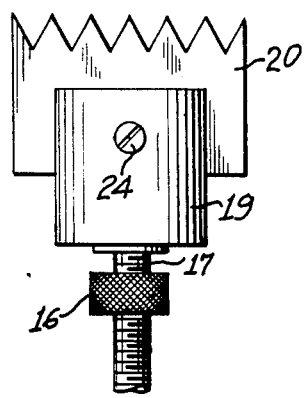
FIG. 5 is an enlarged assembled view of the components in FIG. 2.
Figure 4:
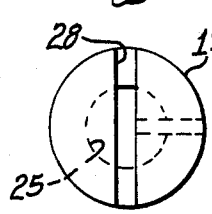
FIG. 4 is a top view of the holder of FIG. 3.

The preferred structure of these end portions can be seen in FIGS. 2, 3, 4 and 5. Arm 13 is internally threaded to receive threaded shank 17. Lock nut 15 is threaded internally to mate with shank 17. At the outer end of shank 17 is cylindrical head 18 with a circumferential groove 21 adjacent the end of head 18. Holder 19 has a cylindrical recess 25 in its bottom to receive head 18. One or more, preferably at least two balls 23 of a size to roll in groove 21 are inserted into tapped holes 27 and held against groove 21 by set screws 23. This permits holder 19 to rotate freely about head 18 while being attached to head 18. Thread profile plate 20 is inserted into slot 28 and clamped therein by screw 24. In order to prevent sidewise movement plate 20 preferably is stepped as at 29. The preferred configuration of plates 20 is such that each of a pair of plates used simultaneously on the micrometer caliper be displaced one-half pitch length from the other plate (as seen in FIGS. 1 and 2). This means that the centerline axis of the micrometer caliper will intersect the thread profile of one plate at the root of the thread and the other plate at the crest of the thread. It is to be understood that this invention contemplates a plurality of plates 20 or pairs of plates 20 to fit any of the types and sizes of threads to be encountered in the use of this micrometer caliper. This device is particularly useful in measuring thread diameters on large pieces of equipment (e.g. up to about 48 inches), such as ship's propeller shafts. One tremendous economic advantage of this invention is that plates 20 can be inexpensively stamped out rather than to be an expensively machined cylindrical tip as employed in the prior art devices.

Figure 6:
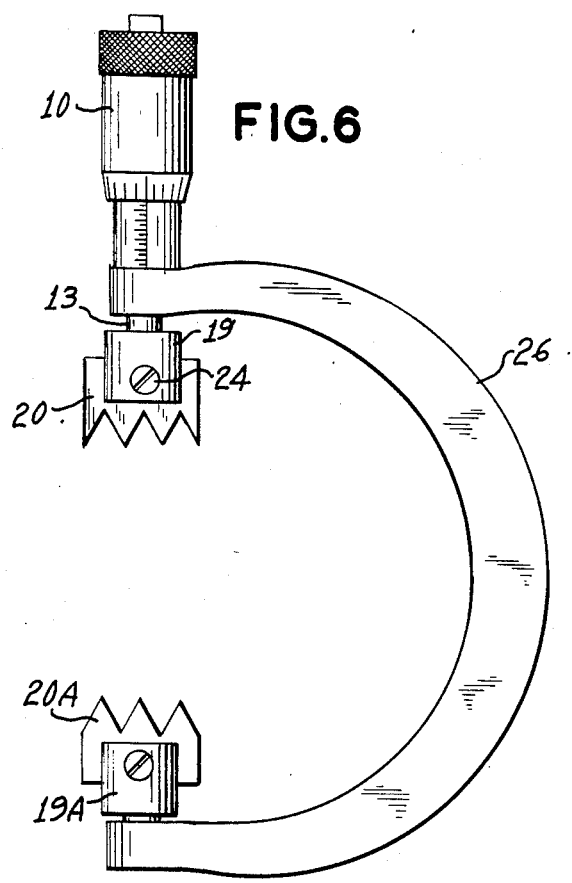
FIG. 6 is a plan view of the outside micrometer of this invention.

In FIG. 6 there is shown the device of this invention in an outside micrometer caliper frame 26 fitted with a fixed holder 19A and its tooth profile plate 20A. At the other end of frame 26 is movable holder 19 and its tooth profile plate 20 mounted on arm 13 operably connected to body 10.

It is preferable that at least one of the ends include a threaded shaft adjustable as herein before described, so that the calibration of the micrometer may be made as known in the art. While an external micrometer is shown here the invention is believed to have a greater utility as an internal micrometer.

Figure 7:
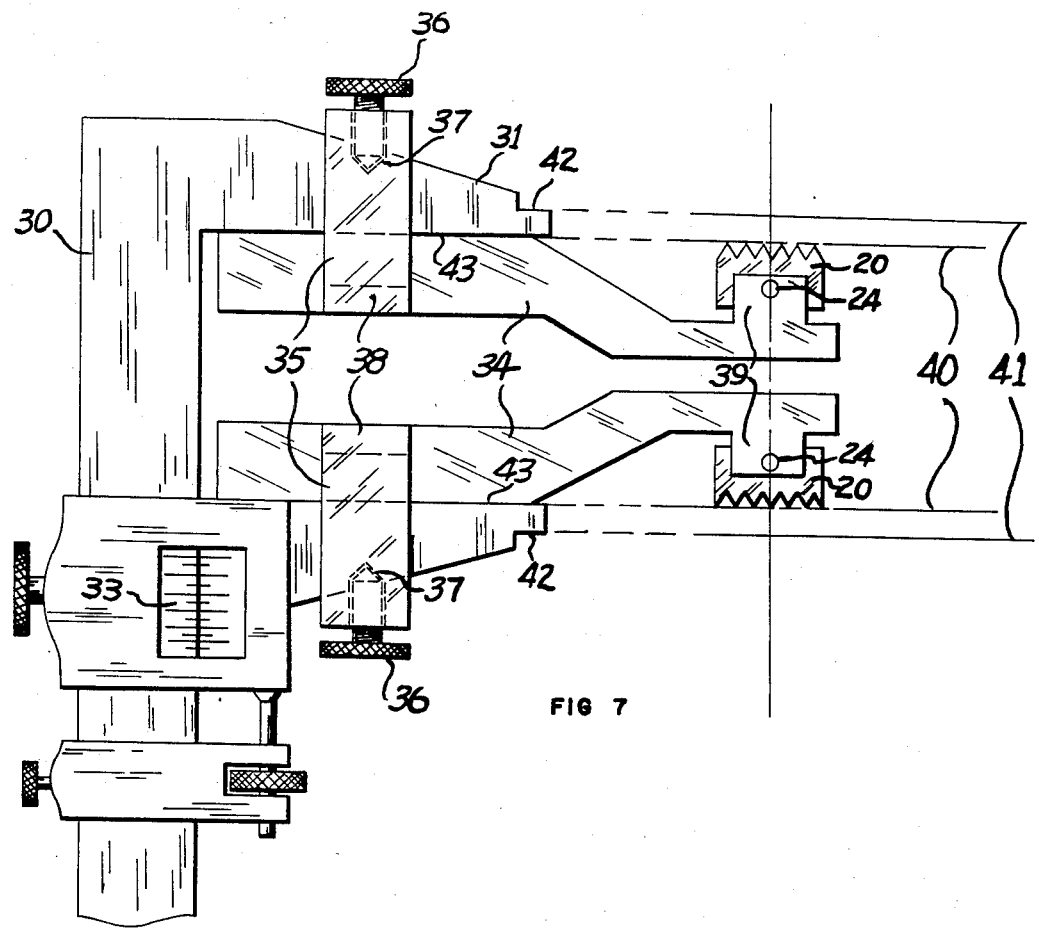
FIG. 7 is a plan view of an internal vernier caliper of this invention.
Figure 8:
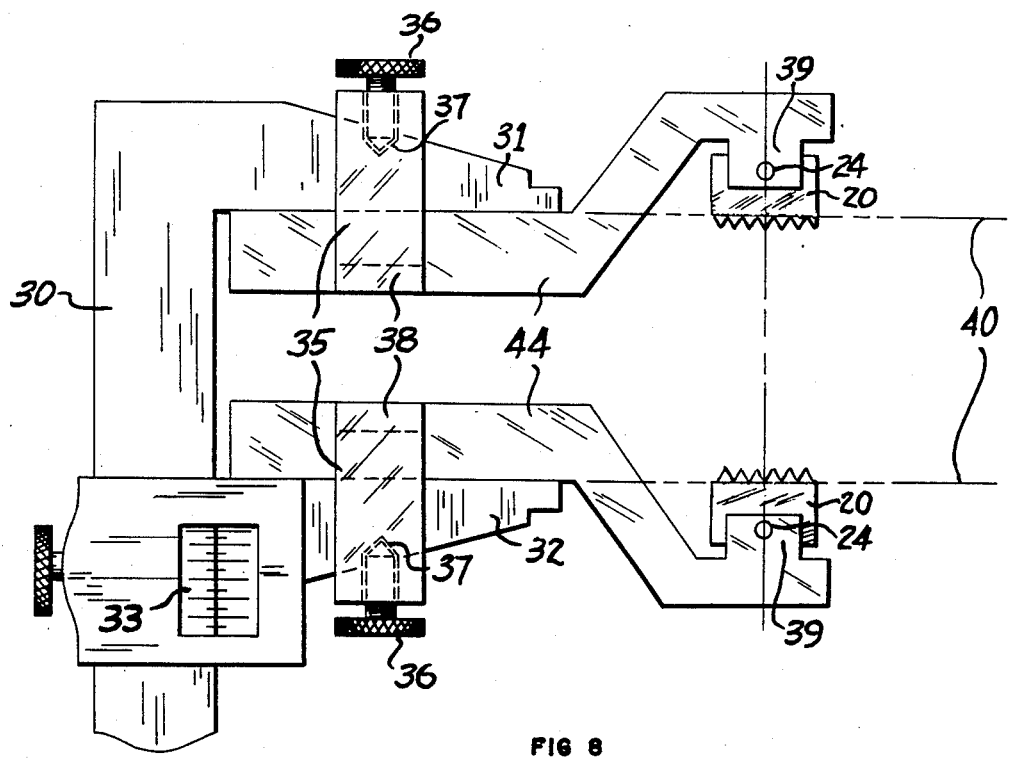
FIG. 8 is a plan view of an external vernier caliper of this invention.

In FIGS. 7 and 8 there is shown the manner in which the invention is applied to vernier calipers 30 having a fixed leg 31 and a movable leg 32 to which is attached a vernier scale 33. In order to apply the present invention to calipers 30 arms 34 are attached to legs 31 and 32 by clamps 35 held in place by set screws 36 which mate with recesses 37 in each of legs 31 and 32. In the embodiment shown here each arm 35 has a notch 38 which receives the base of clamp 35. Other designs of clamp 35 can be imagined which would be equally operable. At the free end of each arm 34 there is a slotted holder 39 similar in structure to holder 19 of FIGS. 1-6, into which is placed thread profile plate 20 and held in place by set screw 24. By the appropriate design of arms 34, the crest of plates 20 can be made to exactly match the inside edges 43 of legs 31 and 32 as shown by extension lines 40 so as to have a zero setting on vernier scale 33 be applicable to plates 20. If desired the design of arms 34 can be slightly altered so that the zero setting of the vernier scale matches the extension lines 41 from edges 42 used to make internal measurements with vernier caliper 30.

For external thread measurements the arrangement of FIG. 8 is employed. All features and component parts are the same as for that described with respect to FIG. 7 except that arms 44 are slightly different in design from arms 34.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what is desired to secure by Letters Patent of the United States is:

1. In a caliper having a body of at least two cooperating members relatively movable with respect to each other to cause the distance between said members to be longer or shorter along a linear lengthwise measurement axis; the improvement which comprises a combination structure attached to each said member in axial alignment, each said structure including a support means for attachment to said member at a desired extension therefrom, a releasable clamping means connected at the end of said support means, each said support means including an element having opposing side walls, and a substantially rectangular planar tip having one elongated edge portion releasably clampable to each said clamping means and having an opposite free edge of a selected screw threaded profile contour having multiple roots and crests on each and appropriate to the thread contour of the object being measured by the caliper, said one edge portion including a stepped groove engaged with respective said side walls of said element for preventing movement in the plane of said planar member between its opposite side edges, one of said planar tips having a thread profile which intersects said axis at the root of the thread and the other of said planar tips having a thread profile which intersects said axis at the crest of the thread.

2. The caliper of claim 1 wherein at least one of said clamping means is rotatable about said axis.

3. The caliper of claim 1 wherein said caliper is a vernier caliper with said two cooperating members being defined by slidable legs so as to cause the distance between said legs to be shorter or longer along a linear movement of said legs along an axis parallel to said lengthwise measurement axis, said members further including extension arms each having opposite end portions with one of each of said end portions being respectively connected to said legs and said arms being disposed facing each other, said clamping means being attached to each of the other said end portions of said arms.

4. The caliper of claim 3 wherein said thread contour of said tips face diametrically opposite each other whereby internal measurements of internally threaded objects may be determined.

5. The caliper of claim 3 wherein said threaded contour of said tips face diametrically toward each other whereby measurements of externally threaded objects may be determined.

6. The caliper of claim 3 further comprising releasable securing means for attaching said arm to said leg.

7. The caliper of claim 1 wherein at least one of said members is rotatable about said axis.

8. The caliper of claim 1 wherein said caliper is a micrometer caliper with one of said body members having an internally threaded arm extending axially therefrom, said support means including a shaft externally threaded to mate with the threads of said arm, and a lock nut threadedly connected on the threads of said shaft to position the end of said shaft at said desired extension.

9. The micrometer caliper of claim 8 wherein said thread contour of said tips face diametrically opposite each other whereby internal measurements of internally threaded objects may be determined.

10. The micrometer caliper of claim 8 wherein said threaded contour of said tips face diametrically toward each other whereby measurements of externally threaded objects may be determined.

11. The micrometer caliper of claim 8 wherein said releasable clamping means includes an elongated holder having one end portion for receiving and clamping said planar tip, connecting means engaged with the other end portion of said holder for rotatably attaching said holder to said support means.

12. The micrometer caliper of claim 11 wherein said connecting means includes a head having a cylindrical portion with a circumferential groove about its surface, said holder having a cylindrical recess to receive said head, and a retainer means to mate with said groove to fasten said holder to said head with said holder being freely rotatable with respect to said head affixed to said support means.

13. The micrometer caliper of claim 12 wherein said retainer means includes at least one ball rollable in said groove and partially extending into a lateral passageway in said holder communicating with said groove.

14. The caliper of claim 1 wherein said caliper is a micrometer caliper with each of said body members including an internally threaded arm extending axially therefrom, said support means including a pair of shafts externally threaded to mate with the threads of respective said arm, and a pair of lock nuts respectively connected on the threads of respective said shaft to position the end of said shaft at said desired extension.

15. The micrometer caliper of claim 14 wherein said thread contour of said tips face diametrically opposite each other whereby internal measurements of internally threaded objects may be determined.

16. The micrometer caliper of claim 15 wherein said releasable clamping means includes a pair of elongated holders each having one end portion for receiving and clamping said planar tip and another planar tip, said connecting means including a pair of rotatable means for respectively attaching said holders to respective said shafts.

17. In a micrometer caliper having two concentric cylindrical body members, at least one of which is rotatable about the common lengthwise axis for both members, each said body member having opposite end portions, the improvement which comprises an internally threaded extension arm attached to each member at one of said end portions, a threaded shank threadedly affixed to each said arm and having a free outer end portion, a cylindrical head mounted on each said arm outer end portion, means for locking each said shank at any desired extension from said arm, a releasably clampable holder freely rotatably attached to said cylindrical head, and a planar tip attached to each said holder and having a free edge of a selected screw thread profile adapted to mate with a contour of a surface from which a measurement is taken by the micrometer, each said head including a circumferential groove about its outer surface, each said holder including a cylindrical recess to receive respective said head, and ball means between each said holder and respective said head contacting said groove and retained by said holder to rotatably mount each said holder, one of said planar tips having a thread profile which intersects said axis at the root of the thread and the other of said planar tips having a thread profile which intersects said axis at the crest of the thread.

18. The micrometer caliper of claim 17 further comprising a set screw to retain said ball in said holder.

19. The micrometer caliper of claim 17 wherein each said holder includes a planar slot for receiving respective said planar tip, said releasably clampable holder including a set screw threadedly connected to said holder and engaged against said planar tip to retain said planar tip in said holder.

20. The micrometer caliper of claim 17 wherein each said means for locking comprises a lock nut operably mounted on respective said threaded shank.

21. The micrometer caliper of claim 17 wherein said profiles of said free edges of said planar tips are mounted toward each other for movement toward and away from each other to measure external threads.

22. The micrometer caliper of claim 19 wherein said profiles of said free edges of said planar tips are mounted opposite each other for movement toward and away from each other to measure internal threads.

* * * * *